United States Patent

[11] 3,599,761

[72] Inventors Harold B. Schultz;
Keith H. Fulmer; Richard T. Burnett, all of
South Bend, Ind.
[21] Appl. No. 797,530
[22] Filed Feb. 7, 1969
[45] Patented Aug. 17, 1971
[73] Assignee The Bendix Corporation

[54] HYDRAULIC POWER BRAKE SYSTEM
5 Claims, 2 Drawing Figs.
[52] U.S. Cl. .................................................. 188/170,
188/72.3, 188/196 D
[51] Int. Cl. ..................................................... F16d 65/24
[50] Field of Search ........................................ 188/72.3,
170, 196 D, 196 A; 303/6

[56] References Cited
UNITED STATES PATENTS
| 3,020,094 | 2/1962 | Murty et al. | 188/170 X |
| 3,033,325 | 5/1962 | Tjernstrom | 188/170 |
| 3,195,692 | 7/1965 | Herr et al. | 188/170 |
| 3,203,513 | 8/1965 | Allen | 188/170 |

Primary Examiner—Duane A. Reger
Attorneys—C. F. Arens and Plante, Arens, Hartz, Hix and Smith ABSTRACT: This invention relates to a hydraulic power brake means having two separate sources for hydraulic pressure controlled by a valve to provide separate pressures to a vehicle's front and rear brakes that also is able to regulate a mechanical brake applicator for at least one of the front or rear brakes.

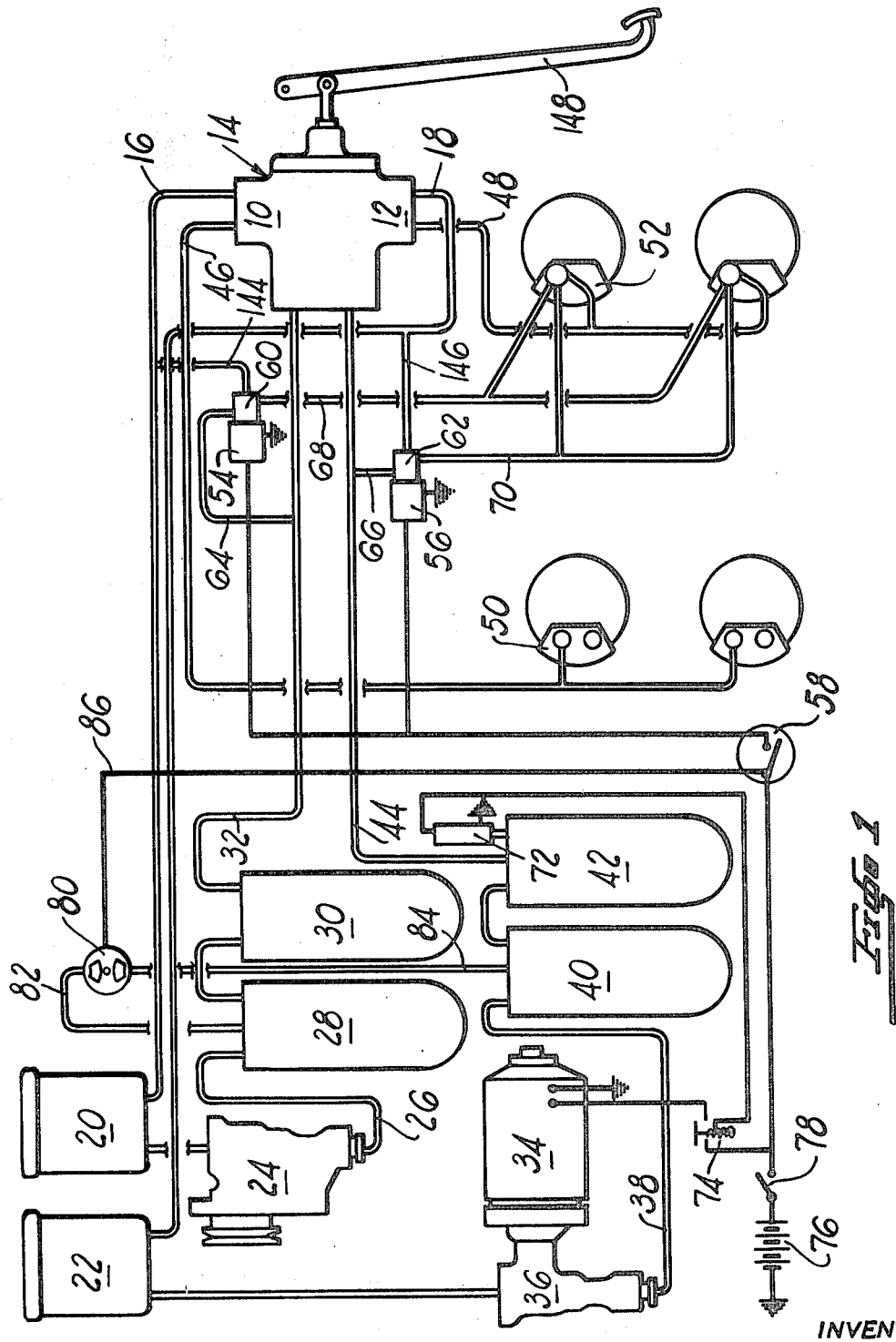

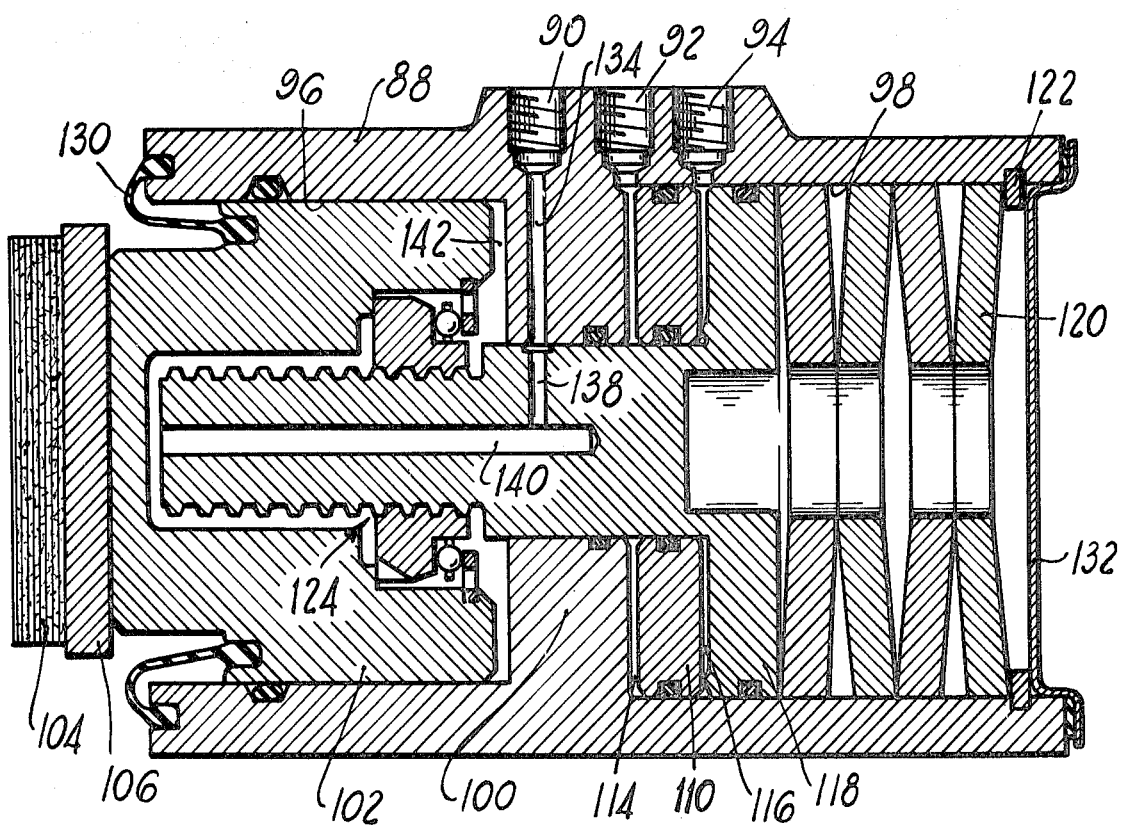

3,599,761

1

HYDRAULIC POWER BRAKE SYSTEM

SUMMARY

For the past several years it has appeared that there will be greater strides toward greater dependability of hydraulic systems made possible by the introduction of a hydraulic power brake system. It is visualized and a proven fact that more reserve and faster response in power braking is possible with such a system.

In order to set the stage for the following specific description of this invention, it should be noted that the term "hydraulic power brake system" is used to identify the system as one in which the force of a driver's foot on the pedal does not cause fluid displacement. This force is used entirely to actuate the control valve and to direct fluid, stored under pressure in an accumulator, directly to the brake actuators. The amount of pressure metered through the valve is in direct proportion to the force applied to the pedal by the driver by means of reaction devices within the valve.

In view of current practice in accordance with Federal laws, the system is actually a dual system with all major components installed in duplicate, except for the control valve which has two complete sets of valving elements in one housing. Each of the two circuits will function independently of the other In normal operation, pressures in each circuit will be the same, within very close limits due to the construction of the valve and its actuation through an internal equalizing lever.

In each of the two systems, the fluid circuit is from a reservoir to a pump to the accumulator to the brake valve and thence to the reservoir upon release. The accumulator is a pressure storage vessel. In the accumulator is a rubber bladder which separates the 800 p.s.i. nitrogen gas discharge from the brake fluid. As the pump discharges fluid in the accumulator, the nitrogen is compressed and the pressure of the nitrogen and brake fluid rises to about 2,000 p.s.i. Pressure is then maintained in the system at 1,800—2,000 p.s.i. In order to provide separate drive means, one of the pumps is to be driven by an electric motor controlled by a pressure switch, as required, to maintain the system pressure; whereas the other pump is driven by a vehicle's engine and contains a regulator which cuts off inlet supply fluid when maximum system pressure is reached.

In the present invention there is shown a complete dual hydraulic power brake system which is divided for mechanically actuating the brakes in response to a signal from the driver, or automatically in case of simultaneous failure of both power systems. Failure of only one system will not activate the mechanical brake actuator in the preferred form of the invention. The signal from the driver to set the brakes for emergency or parking is suggested as a switch to control a solenoid valve. However, as will be appreciated by those skilled in the art to which the invention relates, it could be a pair of hydraulic valves which are manually controlled.

As a result of the above, the principal object of the present invention is to offering segregated braking systems for a vehicle which are improved still further by simple means of providing parking brakes and emergency brakes in case of failure of both of the hydraulic power brake sections.

A further object of the invention is to provide in such a dual hydraulic brake system a means of delivery of each of the sections of the system to a brake actuator containing a mechanical brake applicator so as to be biased against the force of the mechanical brake applicator and thereby render it ineffective under normal powered situations; and at the same time within the means of supply incorporate control mechanisms which will permit the utilization of the mechanical brake applicator for parking brakes for the vehicle.

DRAWING DESCRIPTION

As may be appreciated by those skilled in the art, while the invention is shown specifically related to a brake system for a vehicle there are undoubtedly other applications in which one may need such a hydraulic control means as is suggested herein. In any event, applicant has found a very worthwhile contribution by the invention to the braking art and has shown the invention with respect thereto as follows:

FIG. 1 is a schematic illustration of a hydraulic power brake system incorporating the features of this invention; and FIG. 2 is a cross-sectional illustration of a brake applicator incorporating means for combining a hydraulic actuator with a mechanical brake applicator and having features to normally hold the mechanical brake applicator ineffective.

DETAILED DESCRIPTION

With reference now to Fig. 1 there is shown control valves 10 and 12 in a common housing 14 connected by means of separate conduits 16 and 18 to fluid supply reservoirs 20 and 22. An engine-driven pump 24 is connected by a conduit 26 to an accumulator 28, which could be used alone if desired, but which is shown in series with another accumulator 30 in order to increase fluid reserve capacity. The accumulators are connected by means of a conduit 32 to the control valve 10 in the housing 14. An electric motor 34 drives another pump 36 to provide pressurized hydraulic fluid via conduit 38 to another accumulator means comprising accumulators 40 and 42 with a conduit 44 connecting this accumulator means to the control valve 12 within the housing 14. Conduits 46 and 48 connect control valves 10 and 12 to front disc brake means 50 and rear disc brake means 52, respectively.

Solenoids 54 and 56 controllable by means of a switch 58 arranged to monitor hydraulic control valves 60 and 62, respectively, that are inserted in the aforementioned system so as to normally communicate hydraulic pressure received from conduits 64 and 66 to conduits 68 and 70 leading to the rear disc brake actuators 52.

As mentioned above, the pump 24 will have its own pressure regulating means internally thereof to maintain accumulators 28 and 30 at approximately 2,000 p.s.i.; whereas pump 36 is controlled by a pressure sensitive switch 72 which will regulate the operation of a relay 74 to connect motor 34 with a vehicle's storage battery 76 as long as an ignition switch 78 is closed to maintain approximately 2,000 p.s.i. in accumulators 40 and 42. A pressure gauge and warning means 80 is connected to each of the accumulators by means of conduits 82 and 84 and by means of an electrical lead 86 to the vehicle's battery 76 whenever ignition switch 78 is closed so as to provide the operator of the vehicle with a pressure indication and a warning light in the event of a pressure failure in one or both of the segregated systems.

With reference now to FIG. 2, there is shown a caliper-type disc brake actuator housing 88 having ports 90, 92 and 94 for connection with conduits 48, 68 and 70. Housing 88 is machined to provide a bore 96 at one end and another bore 98 at the other end separated by a partition 100. Within bore 96 a piston 102 is assembled for actuating disc brake pad 104 by being connected with its backing plate 106. Immediately to the right of the partition 100 within bore 98 a floating piston 110 is assembled so as to provide variable volume chambers 114 and 116 within the bore 98 and further defined by movable wall 118 positioned in bore 98 by Belleville washers 120 held within the bores by means of a snap ring 122 to provide a fixed reference point for an automatic adjuster mechanism 124. The bore 96 is then closed by means of a rubber boot 130, and bore 98 is closed by means of press-fitted cap 132.

It should be noted that in the attitude shown in FIG. 2 spring 120 has caused piston 102 to move the pad 104 into its braking attitude. When pressure is available at ports 92 and 94, wall 118 will be moved to its extreme right, normal, position where the effect of the Belleville washers 120 is then overcome by the aforesaid hydraulic pressures. The hydraulic pressure from conduit 48 that enters via port 90 passes through a passage 134 into a radial passage 138 to an axial passage 140 to permit communication of this hydraulic pressure to chamber 142 for actuating piston 102.

Floating piston 110 is preferably of equal effective area as annular portion of wall 118 therebehind such that pressure from either of the ports 92 or 94 will be effective to overcome the bias of the Belleville washers 120 on the wall 118, and thereby render the mechanical bake applicator (the Belleville washers) ineffective when pressure is available to either of these chambers.

Before passing on to the operation it should be noted that the hydraulic valves 60 and 72 (see FIG. 1) are communicable by means of conduits 144 and 146 to return lines 16 and 18 for the control valves 10 and 12.

OPERATION

In operation, braking is normally controlled by valves 10 and 12, the latter of which supplies fluid pressure to port 90 and via passages 134, 138 and 140 to chamber 142 for actuating piston 102. Assuming adequate brake pressure supply is available in accumulators 28, 30 and 40, 42 or in just one of these accumulator means, and so long as switches 58 and 78 are closed, pressure in chambers 114 and 116 will be effective to overcome the force of Belleville washers 120 and maintain the collapsed condition of same. In the event that switches 58 or 78 are opened, valves 60 and 62 will port chambers 114 and 116 to the return conduits 144 and 146 so as to remove the effect of hydraulic pressure in chambers 114 and 116. The spring means 120 (the Belleville washers) will then be effective to, via the automatic adjuster means 124, push the piston 102 to in turn move the disc brake pad 104 to its braking position. This is true even though there has been a pressure application via control valve 12, with the operator depressing brake pedal 148. Therefore, in the preferred form shown, the vehicle operator would normally maintain switch 58 in the closed condition, unless he wants parking brakes while the engine is running. Also, as is obvious in this preferred form, the spring 120 will apply the b rakes whenever ignition switch 78 is opened.

In the event that both of the accumulator means 28, 30 and 40, 42 were to rupture or to otherwise loose pressure for conduits 32 and 44, respectively, this should also deplete the pressure in chambers 114 and 116 and permit the mechanical brake applicator in the form of Belleville washers 120 to actuate the disc brake pad 104 in the same manner as referenced above respect to operation of switch 58.

In closing it should be noted that the mechanical brake applicator can be released by opening switch 58 to return the communication of conduits 64 and 66 with conduits 68 and 70 communicable to ports 92 and 94 to reset the mechanical brake applicator from within the cab of the vehicle. It is also envisioned that a separate hydraulic pressure source could be introduced to either port 92 or 94 by a simple valve assuming a double failure, that would permit the vehicle operator to move his vehicle readily in the event he has stopped in a precarious position as a result of the application of the brakes by spring 120.

We claim:

1. A disc brake actuator comprising:
   a housing having a bore means separated into first and second portions by a partition;
   a first piston in said first portion, said first piston having connected therewith a disc brake pad on one side and an automatic adjuster means on the other which means projects through said partition into said second portion with passage means from said first portion to a first pressure inlet port;
   a floating piston in said second portion adjacent said partition to create a first variable volume chamber therebetween open to a second pressure inlet port;
   a second piston in said second portion creating a second variable volume chamber between it and said floating piston, said second piston being connected to said automatic adjuster means, said second variable volume chamber being open to a third pressure inlet; and
   spring means in said second portion between said housing and said second piston to bias same to move said first piston to apply said brake pad.

3. The structure of claim 1, wherein said floating piston and said second piston have areas for exposure to fluid pressure individually capable of overcoming said spring means.

3. In a disc brake actuator for use with a vehicle hydraulic system having a pair of pressure sources:
   a housing defining a bore therewithin having an open end;
   first piston means slidable in said bore toward and away from said open end;
   a friction element operably connected to open end of said first piston means;
   second piston means slidably mounted in said bore; and
   resilient means operatively connected to said second piston means for urging the latter into engagement with said first piston means and thereafter urging the latter into engagement with said first and second piston means as a unit toward said open end;
   said second piston means cooperating with said housing to define a cavity therebetween in fluid communication with each of said fluid pressure sources, the force of fluid pressure in said cavity acting upon said second piston means to oppose the resiliency of said resilient means to permit movement of said first piston means with respect to the second piston means as long as fluid pressure from at least one of said sources is admitted into said cavity;
   said housing including a wall dividing said bore into first and second sections;
   said cavity being defined between said wall and said second piston means; and
   means within said cavity dividing the latter into first and second compartments;
   one of said compartments being in fluid communication with one of said pressure sources, the other compartment being in fluid communication with the other pressure source.

4. The invention of claim 3,
   said last-mentioned means being a floating piston slidably mounted within said cavity.

5. The invention of claim 3,
   said last-mentioned means being an annular member slidably mounted within said cavity;
   said wall defining an opening extending therethrough;
   said second piston means including a first portion slidably mounted in said second compartment and a second portion extending through said openings into said first compartment; and
   said second portion engaging the other end of said first piston means.